(12) United States Patent
Nikolov (10) Patent No.: US 11,075,588 B2
(45) Date of Patent: Jul. 27, 2021

(54) INVERTER SYSTEMS

(71) Applicant: GE GLOBAL SOURCING LLC, Norwalk, CT (US)

(72) Inventor: Emil N. Nikolov, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 16/710,375

(22) PCT Filed: Mar. 20, 2019

(86) PCT No.: PCT/US2019/023052
§ 371 (c)(1),
(2) Date: Dec. 11, 2019

(87) PCT Pub. No.: WO2019/212652
PCT Pub. Date: Nov. 7, 2019

(65) Prior Publication Data
US 2021/0167696 A1     Jun. 3, 2021

Related U.S. Application Data

(60) Provisional application No. 62/665,169, filed on May 1, 2018.

(51) Int. Cl.
*H02M 7/497* (2007.01)
*H02M 7/493* (2007.01)
(Continued)

(52) U.S. Cl.
CPC .......... *H02M 7/493* (2013.01); *H02M 1/088* (2013.01); *H02M 1/10* (2013.01); *H02M 7/497* (2013.01);
(Continued)

(58) Field of Classification Search
CPC ............ H02M 7/42; H02M 7/44; H02M 7/48; H02M 7/493; H02M 7/497; H02M 7/501;
(Continued)

(56) References Cited

U.S. PATENT DOCUMENTS 6,014,323 A     1/2000 Aiello et al.
9,065,328 B2 *  6/2015 Papastergiou .......... H02J 1/102
(Continued)

FOREIGN PATENT DOCUMENTS

EP     2290799       3/2001
JP     H09168205     6/1997
(Continued)

OTHER PUBLICATIONS

International Preliminary Report on Patentability dated Nov. 12, 2020 for corresponding International application No. PCT/US2019/023052.

(Continued)

*Primary Examiner* — Gary L Laxton
(74) *Attorney, Agent, or Firm* — Mary D. Lawlor; The Small Patent Law Group LLC (57) ABSTRACT

An inverter system is provided that includes switches that alternate between closed and open states to conduct or block conduction, respectively, of electric current through the switches and switch controllers that control operation of the switches between the closed and open states. In a first operating mode, the controllers control operation of the switches to convert direct current into a single, common phase of an alternating current from a same phase output from each of the switches to power a higher-demand load of a powered system with the single phase of the alternating current. In a second operating mode, the controllers control operation of the switches to convert the direct current into multiple, different phases of the alternating current to power (Continued)

a lower-demand load of the powered system with the multiple, different phases of the alternating current. Each of the switches outputs a different phase of the multiple phases.

20 Claims, 6 Drawing Sheets

(51) Int. Cl.
  *H02M 1/088* (2006.01)
  *H02M 7/537* (2006.01)
  *H02M 1/10* (2006.01)
  *H02M 1/00* (2006.01)
(52) U.S. Cl.
  CPC ...... *H02M 7/537* (2013.01); *H02M 2001/007* (2013.01)
(58) Field of Classification Search
  CPC ... H02M 1/10; H02M 7/537; H02M 2001/007
  See application file for complete search history.

(56) References Cited

U.S. PATENT DOCUMENTS

| | | | | |
|---|---|---|---|---|
| 9,236,739 | B2* | 1/2016 | Ford | H02J 3/005 |
| 10,148,093 | B2* | 12/2018 | Dent | H02M 1/126 |
| 2007/0217239 | A1* | 9/2007 | Rottger | H02M 7/42 |
| | | | | 363/131 |
| 2012/0113694 | A1* | 5/2012 | Schill | H02M 3/155 |
| | | | | 363/65 |
| 2018/0191269 | A1* | 7/2018 | Knight | H02M 7/493 |

FOREIGN PATENT DOCUMENTS

| | | |
|---|---|---|
| JP | 2016167916 | 9/2016 |
| KR | 20080017031 | 2/2008 |

OTHER PUBLICATIONS

International Search Report dated Jun. 28, 2019.

* cited by examiner

INVERTER SYSTEMS

CROSS-REFERENCE TO RELATED APPLICATIONS

This application claims priority to International Patent Application PCT/US2019/23052, filed 20 Mar. 2019, which claims priority to U.S. Provisional Application No. 62/665,169, which was filed on 1 May 2018. The entire disclosures of which are incorporated herein by reference.

TECHNICAL FIELD

Embodiments of the subject matter disclosed herein generally relate to inverters.

BACKGROUND

Inverters convert one electrical power waveform into another, e.g., direct current (DC) into alternating current (AC). Conventional inverters include a plurality of semiconductor switches (e.g., insulated gate bipolar transistors, power MOSFETS, and/or the like) that are switched on and off by driver circuitry in an alternating fashion to produce an output alternating current waveform. Some powered systems include different inverters that power different loads of the powered system. For example, some vehicles may include inverters that power traction motors that propel the vehicles and may include different inverters that power auxiliary systems and/or components.

BRIEF DESCRIPTION

In an embodiment, an inverter system comprises plural switches that alternate between closed and open states to conduct or block conduction, respectively, of electric current through the switches. The system includes plural switch controllers that control operation of the switches between the closed and open states. In a first operating mode, the switch controllers control the operation of the switches to convert direct current into a single, common phase of an alternating current from a same phase output from each of the switches to power a higher-demand load of a powered system with the single phase of the alternating current. In a second operating mode, the switch controllers control the operation of the switches to convert the direct current into multiple, different phases of the alternating current to power a lower-demand load of the powered system with the multiple, different phases of the alternating current. Each of the switches outputs a different phase of the multiple phases.

In an embodiment, a method comprises in a first operating mode, with plural switch controllers, alternating plural switches between closed and open states to conduct a direct current supplied to the switches to a single, common phase of an alternating current from a same phase output from each of the switches. The method also comprises in a different, second operating mode, with the plural switch controllers, alternating the switches between the closed and open states to convert the direct current to multiple, different phases of the alternating current. Each of the switches outputs a different phase of the multiple phases. The single, common phase of the alternating current that is generated in the first operating mode is supplied to a powered system as a higher-demand load, and the multiple, different phases of the alternating current that is generated in the second operating mode is supplied to the powered system as a lower-demand load.

In an embodiment, a vehicle inverter system comprises plural switches that alternate between closed and open states to conduct or block conduction, respectively, of electric current through the switches. The system includes plural switch controllers that control operation of the switches between the closed and open states. In a first operating mode, the switch controllers control the operation of the switches to convert direct current into a single, common phase of an alternating current from a same phase output from each of the switches to power a propulsion-generating load of a vehicle system with the single phase of the alternating current. In a second operating mode, the switch controllers control the operation of the switches to convert the direct current into multiple, different phases of the alternating current to power a non-propulsion-generating load of the vehicle system with the multiple, different phases of the alternating current. Each of the switches outputs a different phase of the multiple phases.

In an embodiment of the subject matter described herein, an inverter system comprises plural switches controllable between closed and open states to conduct or block conduction, respectively, of electric current through the switches, and plural switch controllers to control operation of the switches between the closed and open states. In a first operating mode, the switch controllers control the operation of the switches to convert first direct current into a single, common, first electrical power output from all of the switches to power a higher-demand load of a powered system with the first electrical power. In a second operating mode, the switch controllers also control the operation of the switches to convert the first direct current into multiple second electrical power outputs to power one or more lower-demand loads of the powered system with the second electrical power outputs. Each of the switch outputs a different one of the second electrical power outputs and the second electrical outputs have different voltage levels or different waveforms from each other second electrical power output.

BRIEF DESCRIPTION OF THE DRAWINGS

The presently described subject matter will be better understood from reading the following description of non-limiting embodiments, with reference to the attached drawings, wherein below.

DETAILED DESCRIPTION

The inventive subject matter described herein provides an inverter system that may be used to power one or more loads of a powered system. The inverter system operates in different modes of operation to power the different loads of the powered system while using the same hardware. The inverter system includes plural switches and plural switch controllers that control operation of each of the switches between an open and closed states. Operating in a first mode of operation, each of the switches of the inverter system may convert direct current from a power source into a single, common phase of alternating current in order to power a higher-demand load of the powered system. Alternatively, operating in a second mode of operation, each of the same switches of the same inverter system may convert direct current into multiple, different phases of alternating current to power a lower-demand load of the powered system.

With reference to the drawings, like reference numerals designate identical or corresponding parts throughout the several views. However, the inclusion of like elements in different views does not mean a given embodiment necessarily includes such elements or that all embodiments of the invention include such elements.

Figure 1:
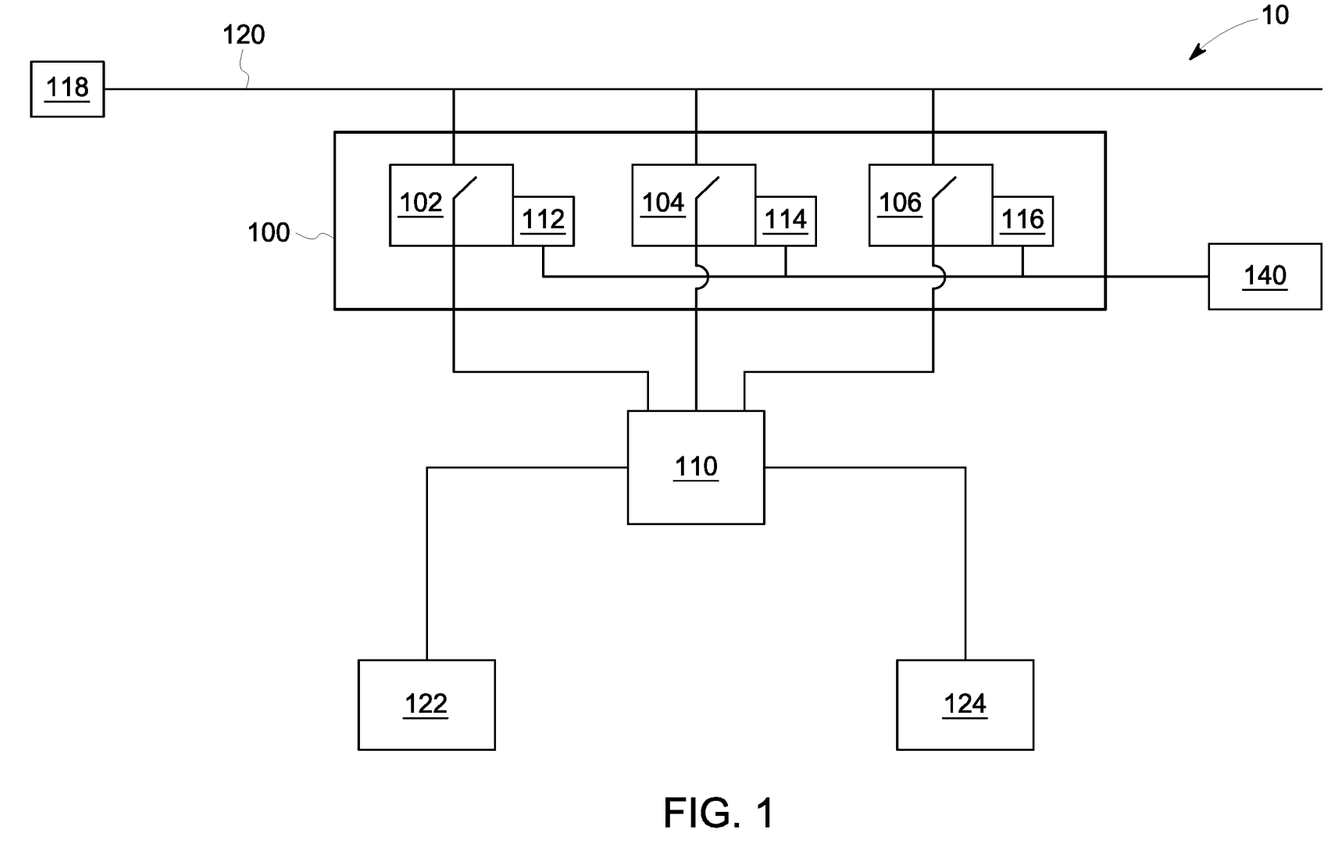
FIG. 1 is a schematic illustration of an inverter system of a powered system in accordance with one embodiment.

FIG. 1 is a schematic illustration of one embodiment of a powered system 10. The powered system 10 includes an inverter system 100 and a DC link busbar 120. In one embodiment, the powered system 10 may be a vehicle or a vehicle power system (such as an automobile, mining vehicle, rail vehicle, marine vessel, or other self-propelling vehicle) and the inverter system 100 may be used to power loads such as traction motors, auxiliary systems or components, other loads, or the like. Alternatively, the powered system 10 may be a stationary power-generating system. The inverter system 100 includes plural switches 102, 104, 106 that are electrically coupled with each other. In one or more embodiments, the switches 102, 104, 106 may be electrically coupled with each other in a parallel electrical connection or in a series electrical connection.

In the illustrated embodiment, the inverter system 100 is a multi-phase inverter with several phase module assemblies. For example, the inverter system 100 may be a three-phase inverter having three phase module assemblies. Optionally, the inverter system 100 may have any number of phase module assemblies. In one or more embodiments, each switch 102, 104, 106 may be a packaged insulative gate bipolar transistor (IGBT) and antiparallel diodes integrated in a housing, or another type of solid state, semiconductor-based device. Optionally, each switch may be a power metal oxide semiconductor field-effect transistor (MOSFET), a thyristor, or the like. In one or more embodiments, the inverter system may include plural common switches (e.g., all IGBT devices), plural unique switches, or any combination therein. In other embodiments, the semiconductor-based devices (switches) may be silicon carbide (SiC) devices and/or gallium nitride (GaN) devices.

The DC link busbar 120 is operably coupled with a power source 118 (e.g., a battery, or the like) that supplies power in the form of direct current (DC) to the DC link busbar 120. Each of the switches 102, 104, 106 of the inverter system 100 are operably coupled with the busbar 120 by conductive plates, traces, buses, or the like. The DC link busbar 120 provides DC to each of the switches 102, 104, 106 which convert the DC into one phase of alternating current. Optionally, the DC link busbar 120 may also provide electrical connections between the inverter system 100 and one or more systems, components, sources, or the like, that are external to the powered system 10.

Each switch 102, 104, 106 is operably coupled with a switch controller 112, 114, 116. Each switch controller 112, 114, 116 controls operation of each corresponding switch 102, 104, 106, respectively. Optionally, the switch controllers 112, 114, 116 may include or also be referred to herein as gate drivers. The switch controllers 112, 114, 116 control operation of the switches 102, 104, 106 between open states and closed states. For example, when operating in an open state, the switch is open and blocks conduction of electric current through the switch, and when operating in a closed state, the switch is closed and conducts electric current through the switch.

Each of the switch controllers 112, 114, 116 are operably coupled with a master controller 140. The master controller 140 may include hardware circuitry that includes and/or is connected with one or more processors (e.g., one or more field programmable gate arrays, one or more microprocessors, and/or one or more integrated circuits) that perform the operations described herein in connection with the master controller. The master controller 140 controls operation of each of the switch controllers 112, 114, 116 between the open or closed states. For example, the master controller 140 may send control signals to one or more of the switch controllers 112, 114, 116 that dictate when each switch opens or closes. The master controller 140 may be manually operated by an operator of the powered system 10, or the master controller 140 may be operated autonomously by one or more processors, operating systems, or the like. Optionally, the inverter system 100 may not include the switch controllers 112, 114, 116 and the master controller 140 may control operation of each of the switches 102, 104, 106. Optionally, the inverter system 100 may be controlled by one or more additional or alternative controllers.

The switch controllers 112, 114, 116 control operation the switches 102, 104, 106 to operate the inverter system 100 in different modes of operation. For example, the switches 102, 104, 106 may provide multiple, different phases of alternating current, a single, common phase of alternating current, multiple, different phases of direct current, a single, common phase of direct current, or a combination therein, in order to power one or more loads of the powered system 10. The alternating or direct current outputs by each of the switches 102, 104, 106 based on the mode of operation of the inverter system 100 are described in more detail below.

The inverter system 100 is operably coupled with a master switch 110. For example, each of the switches 102, 104, 106 are operably coupled with the master switch 110 such that the AC or DC provided by each switch is directed through the master switch 110. The master switch 110 directs the AC or DC converted by each of the switches 102, 104, 106 to a higher-demand load 122 or to a lower-demand load 124. For example, the higher-demand load 122 may require an amount of power in order to operate relative to the lower-demand load 124.

The inverter system 100 may operate in different modes based on which of the higher-demand load 122 or the lower-demand load 124 needs to be powered. In one embodiment, when operating in a first mode of operation, the switch controllers 112, 114, 116 may direct one or more of the switches 102, 104, 106 to open and/or close in order to provide AC from one or more of the switches 102, 104, 106 to power the higher-demand load 122 of the powered system 10. Alternatively, when operating in a different, second mode of operation, the switch controllers 112, 114, 116 may direct one or more of the switches 102, 104, 106 to open and/or close in order to provide AC from one or more of the switches 102, 104, 106 to power the lower-demand load 124 of the powered system 10. The master switch 110 may direct the AC from the inverter system 100 to the higher-demand load 122 or the lower-demand load 124 based on the inverter system 100 operating in the first mode of operation or the second mode of operation.

Alternatively, in one embodiment, when operating in a first mode of operation, the switch controllers 112, 114, 116 may direct one or more of the switches 102, 104, 106 to open and/or close in order to provide a direct current output having a first voltage level and a first power level from one or more of the switches 102, 104, 106 to power the higher-demand load 122 of the powered system 10. Alternatively, when operating in a different, second mode of operation, the switch controllers 112, 114, 166 may direct one or more of the switches 102, 104, 106 to open and/or close in order to provide multiple different direct current outputs from one or more of the switches 102, 104, 106 to power the lower-demand load 124 of the powered system 10. The multiple direct current outputs may have voltage levels and/or power levels that are lower than the first voltage level and lower than the first power level of the direct current output of the switches 102, 104, 106 operating in the first mode of operation.

The inverter system 100, in an embodiment, can be configured to have a range of voltage of about 1.7 kilovolts (kV) to about 4.5 kV and a range of current of about 300 amperes (A) to about 650 A. Optionally, the inverter system 100 can have a different power output, such that the range of voltage is greater than 4.5 kV and/or less than 1.7 kV, and/or the range of current is greater than 650 A and/or less than 300 A. In one or more embodiments, plural inverter systems may be coupled together to achieve different power ranges. For example, plural inverter systems may each be configured to have a voltage of about 1.7 kV, and the coupled inverter systems may be able to achieve about a 3.3 kV and 1800 A power output. In another embodiment, the inverter system can be configured to output between about 500 kW and about 1350 kW at 300 A. In an alternative embodiment, the inverter system can be rated to output between about 1000 kW and about 3000 kW at 650 A. Optionally, the one or more inverter systems may have alternative power outputs and/or ranges of power outputs.

Figure 2:
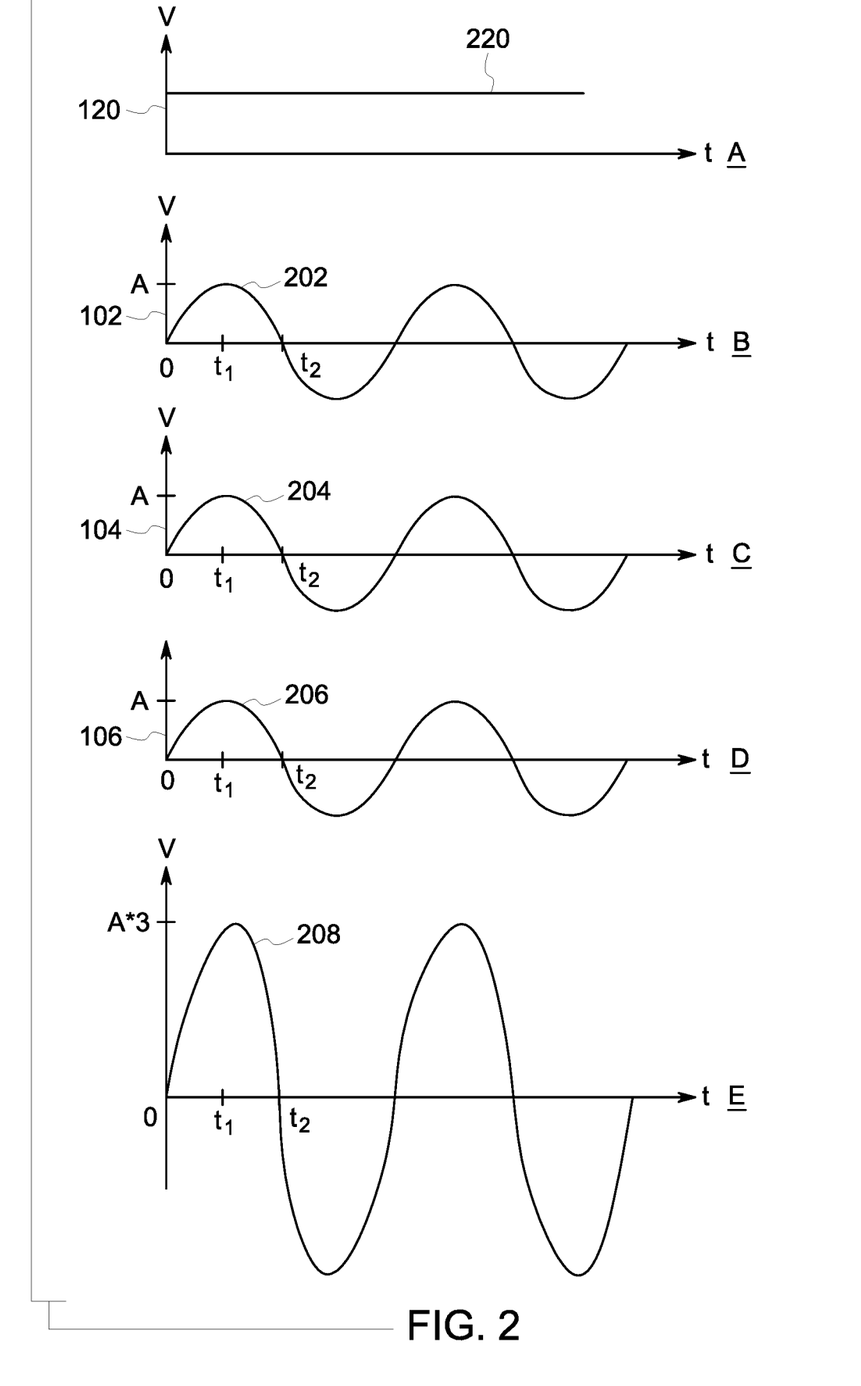
FIG. 2 is an illustration of an inverter system operating in a first mode of operation in accordance with one embodiment.

FIG. 2 is an illustration of the inverter system 100 operating in the first mode of operation in accordance with one embodiment. The inverter system 100 operating in the first mode of operation provides a single, common first electrical power output to the higher-demand load 122 of the powered system 10. For example, the first electrical power output may be a direct current output or a single-phase alternating current output. In the first mode of operation, the switch controllers 112, 114, 116 control operation of the switches 102, 104, 106 to convert the first direct current from the DC link busbar 120 into a single, common phase of the first electrical power output from a same phase output from each of the switches 102, 104, 106 to power the higher-demand load 122 with a single phase of the alternating current. Graph A is a graph illustrating the first direct current supplied to the inverter system 100. Graph B illustrates the alternating current converted by the first switch 102, Graph C illustrates the alternating current converted by the second switch 104, and Graph D illustrates the alternating current converted by the third switch 106. Each of the Graphs A-D have a horizontal axis representative of time, and a vertical axis representative of voltage. Optionally, Graphs B-D may illustrate the direct current outputs converter by the first, second, and third switches, respectively.

As illustrated in Graph A, a substantially constant line of busbar power 220 over time of direct current supplied to the inverter system 100 by the DC link busbar 120 of FIG. 1. Graphs B, C, and D illustrate the alternating waveform of the alternating current that is output by each of the switches 102, 104, 106. As illustrated in Graphs B, C, and D, respectively, the first switch 102 converts the direct current into a first switch output 202, the second switch 104 converts the direct current into a second switch output 204, and the third switch 106 converts the direct current into a third switch output 206. Each of the first, second, and third switch outputs 202, 204, 206 have a common phase with each other. For example, the phase of the alternating current that is output from each of the switches 102, 104, 106 may be the same phase. Additionally, the first, second, and third switch outputs have common voltage amplitudes and common periods (e.g., common waveforms over time).

Graph E illustrates a combination of the first, second, and third switch outputs 202, 204, 206 into a single, common phase 208 of alternating current. For example, each of the switch outputs 202, 204, 206 are added together for the single, common phase 208 of AC. The single, common phase 208 has a voltage amplitude that can be three times the voltage of each of the first, second, or third switch outputs 202, 204, 206. Additionally, the single, common phase 208 has a phase that is common with the phase of each of the switch outputs 202, 204, 206. The common phase 308 has a waveform that has a period over time that is common with the periods of each of the switch outputs 202, 204, 206. When operating in the first mode of operation to power the higher-demand load 122 of the powered system 10, the master controller 140 controls each of the switches to operate together in series or in parallel such that each of the switches 102, 104, 106 converts the direct current into the single, common phase 208 of alternating current. For example, when operating in the first mode of operation, the inverter system 100 provides an amount of power that is greater than the amount of power provided by each of the individual switches 102, 104, 106. The individuals switches are stacked up or provide power in concert with each other to provide an increased amount of current relative to the inverter system 100 not operating in the first mode of operation. In the illustrated embodiment, the inverter system 100 includes the three switches 102, 104, 106 that convert the DC into a single, common phase 208 of alternating current to power the higher-demand load 122 of the powered system 10. Optionally, the inverter system 100 may include any number of switches that may convert the direct current into a single, common phase of alternating current having any amplitude of voltage.

Figure 3:
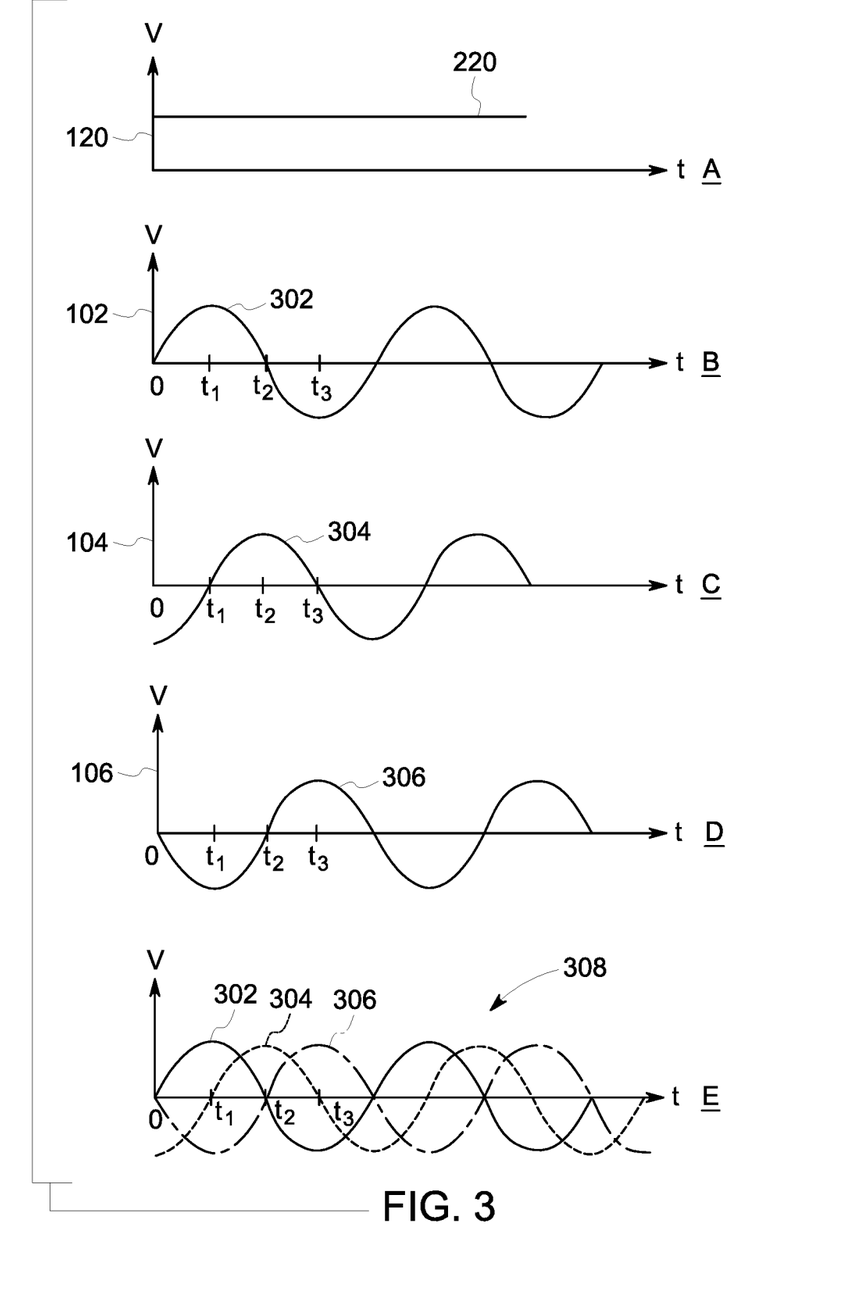
FIG. 3 is an illustration of an inverter system operating in a second mode of operation in accordance with one embodiment.

FIG. 3 is an illustration of the inverter system 100 operating in the second mode of operation in accordance with one embodiment. The inverter system 100, using the same hardware and operating in the second mode of operation, provides multiple electrical power outputs to the lower-demand load 124 of the powered system 10. For example, the electrical power outputs may be different phases of three-phase alternating current for powering one or more of the lower-demand loads 124 or the electrical power outputs may be direct current outputs having voltage and/or power levels that are lower than the voltage and/or power levels of the direct current output of the inverter system 100 operating in the first mode of operation.

In the second mode of operation, the switch controllers 112, 114, 116 control operation of the switches 102, 104, 106 to convert the direct current from the DC link busbar 120 into multiple, different phases of alternating current to power the lower-demand load 124 with the multiple, different phases of alternating current. Graph A is a graph illustrating the direct current supplied to the inverter system 100. Graph B illustrates the alternating current converted by the first switch 102, Graph C illustrates the alternating current converted by the second switch 104, and Graph D illustrates the alternating current converted by the third switch 106. Each of the Graphs A-D have a horizontal axis representative of time, and a vertical axis representative of voltage. Optionally, Graphs B-D may illustrate the direct current outputs converter by the first, second, and third switches, respectively.

Graph A of FIG. 3 corresponds to Graph A of FIG. 2. Graph A illustrates a substantially constant line of busbar power 220 over time of the direct current that is supplied to the inverter system 100 by the DC link busbar 120. Graphs B, C, and D illustrate the alternating waveform of the alternating current that is output by each of the switches 102, 104, 106. As illustrated in Graphs B, C, and D, respectively, the first switch 102 converts the direct current into a first switch output 302, the second switch 104 converts the direct current into a second switch output 304, and the third switch 106 converts the direct current into a third switch output 306. The first, second, and third switch outputs 302, 304, 306 have substantially common voltage amplitudes and common periods over time, but have different phases. In the illustrated example, the phases of the outputs 302, 304, 306 are sixty degrees off from each other. For example, the first switch output 302 begins a phase at a time of T=0, the second switch output 304 begins a phase at a time of T1, and the third switch output 306 begins a phase at a time of T2. Optionally, the first, second, and third outputs 302, 304, 306 may have alternative waveforms that have different voltage amplitudes and/or different periods relative to each other output 302, 304, 306.

Graph E illustrates a combination of the first, second, and third switch outputs 302, 304, 306 as multiple, different phases 308 of alternating current that is used to power the lower-demand load 124 of the powered system 10. When operating in the second mode of operation to power the lower-demand load 124 of the powered system 10, the master controller 140 controls each of the switches 102, 104, 106 to operate as independent switches such that each of the switches 102, 104, 106 convert the direct current into multiple, different phases 308 of alternating current. For example, when operating in the second mode of operation, the inverter system 100 provides an amount of power that is substantially the same as the amount of power provided by each of the individual switches 102, 104, 106. In the illustrated embodiment, the inverter system 100 includes the three switches 102, 104, 106 that convert the DC into three different phases 308 of alternating current to power the lower-demand load 124 of the powered system 10. Optionally, the inverter system 100 may include any number of switches that may convert the direct current into any number of different phases of alternating current.

The inverter system 100 may provide a single, common phase to power higher power loads and may provide multiple, different single phases to power a lower load while using the same hardware. For example, the inverter system 100 may operate in the first mode of operation or in the second mode of operation using the same hardware for both modes of operation. The master controller 140 controls operation of each of the switch controllers 112, 114, 116 between the open and closed states to operate the inverter system 100 in the first mode of operation (e.g., to power the higher-demand load of the powered system) or to operate the inverter system 100 in the second mode of operation (e.g., to power the lower-demand load of the powered system) while using the same hardware. Optionally, the master controller 140 may control operation of the switch controllers 112, 114, 116 to operate the inverter system in any number of different modes of operation.

In one embodiment, the higher-demand load 122 may be a propulsion-generating load of the powered system 10 that propels a vehicle of the powered system 10. For example, the first mode of operation may also be referred to herein as a traction inverter mode. When operating in the traction inverter mode, the inverter system 100 may provide the single, common phase of the alternating current to provide power to the powered system 10 to propel the vehicle of the powered system 10.

In one embodiment, the lower-demand load 124 may be a non-propulsion-generating load of the powered system 10. For example, the second mode of operation may also be referred to herein as an auxiliary inverter mode. When operating in the auxiliary inverter mode, the inverter system 100 may provide the multiple, different phases 308 of the alternating current to provide power to the powered system 10 to operate one or more systems of the powered system 10. For example, the inverter system 100 may provide an amount of power when operating in the auxiliary inverter mode that is less than an amount of power when operating in the traction inverter mode. For example, the higher-demand load 122 may require an amount of power from the inverter system 100 to operate that is greater than an amount of power required from the inverter system 100 to operate the lower-demand load 124. The common, single phase output 208 of the inverter system 100 operating in the first mode of operation (e.g., the traction inverter mode) to power the higher-demand load 122 has a voltage amplitude that is greater than the voltage amplitude of each of the multiple, different phase outputs 308 of the inverter system 100 operating in the second mode of operation (e.g., the auxiliary inverter mode) to power the lower-demand load 124.

In one or more embodiments, the master controller 140 or the switch controllers 112, 114, 116 may control the switches 102, 104, 106 to operate in a mode of operation that is different than the first mode of operation or the second mode of operation. For example, the inverter system 100 may be controlled to operate in a third mode of operation such that the first and second switches 102, 104 convert the direct current into a single phase output, and the third switch 106 convers the direct current into a phase output that is different than the single phase output from the first and second switches 102, 104. Optionally, one or more of the switches 102, 104, 106 may convert the DC into an alternating current with a waveform having a phase, period, and/or voltage amplitude that may be common and/or unique to the alternating current that is provided by one or more other switches.

In one or more embodiments, the inverter system 100 may include one or more switches controlled via a switch controller, and the powered system 10 may include plural different inverter systems that may be coupled with each other inverter system as building blocks. For example, each inverter system may include a single switch and a switch controller that controls the operation of the switch and may be housed, held, or contained with a housing or chassis (e.g., with heat sinks, external plugs, or the like). The inverter system may be coupled with one or more additional inverter systems, and each of the inverter systems may operate in concert with each other inverter system. The plural different inverter systems may be held within a common receptacle or rack, or may be separate from each other inverter system.

Figure 4:
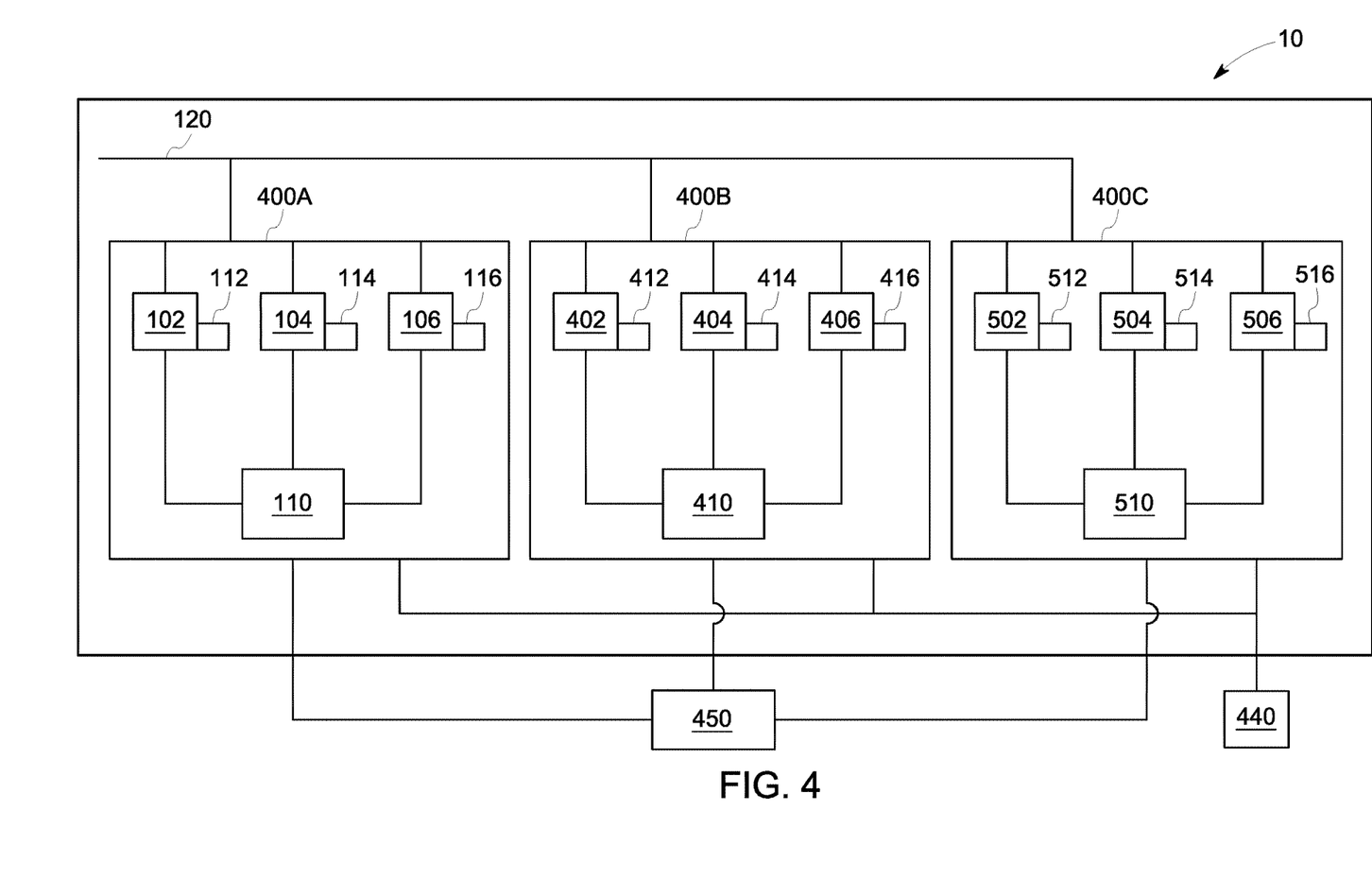
FIG. 4 is a schematic illustration of plural inverter sets of a powered system in accordance with one embodiment.

FIG. 4 is a schematic illustration of plural inverter sets 400A, 400B, 400C of the powered system 10 in accordance with one embodiment. Each of the inverter sets 400A, 400B, 400C includes plural switches and plural switch controllers. For example, a first inverter set 400A includes the switches 102, 104, 106 and the switch controllers 112, 114, 116 that control operation of each of the switches 102, 104, 106. A second inverter set 400B includes switches 402, 404, 406 and switch controllers 412, 414, 416 that control operation of each of the switches 402, 404, 406. A third inverter set 400C includes switches 502, 504, 506 and switch controllers 512, 514, 516 that control operation of each of the switches 502, 504, 506. In the illustrated embodiment, the powered system 10 also includes a master controller 440 that controls operation of each of the switch controllers of each inverter set 400A, 400B, 400C. Optionally, one or more of the inverter sets 400A, 400B, 400C may be controlled by an alternative controller, method, or system. The master controller 440 may be controlled manually be an operator of the powered system 10 and/or may be controlled autonomously with firmware or software of the master controller 440, by one or more processors of the master controller 440, or the like.

Figure 5:
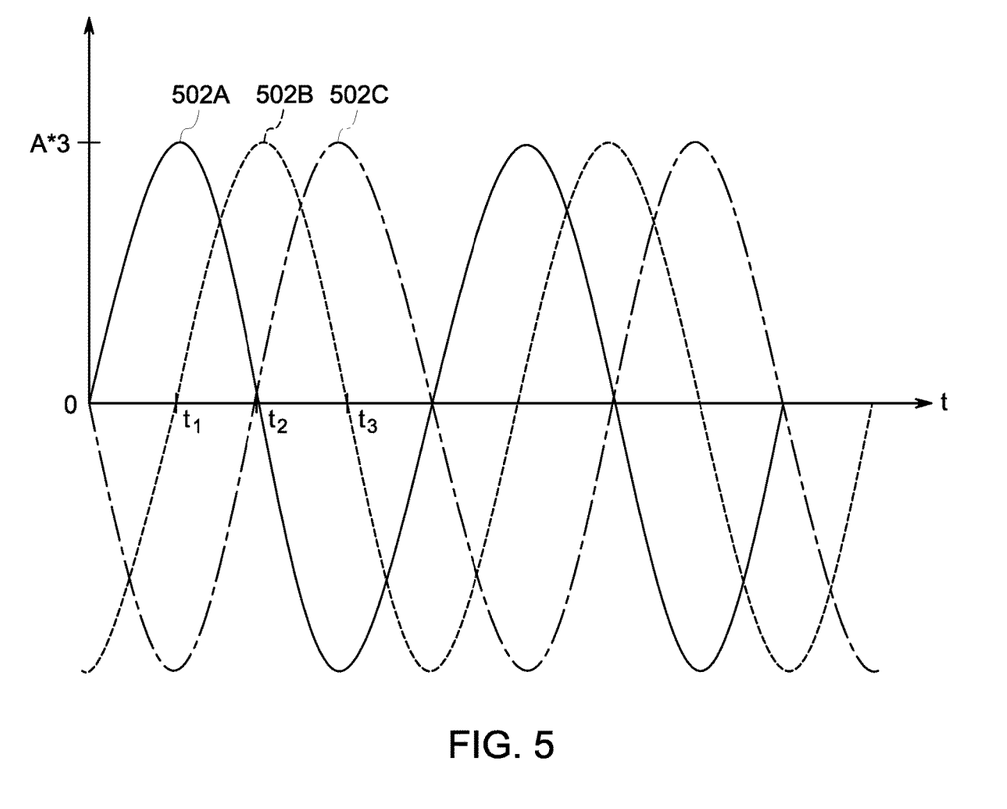
FIG. 5 is an illustration of the plural inverter sets of FIG. 4 operating in a first mode of operation.

When operating in the first mode of operation, each of the inverter sets 400A, 400B, 400C convert the first direct current from the DC link busbar 120 into a single, common phase of alternating current that is different from the single, common phase of alternating current converted by each other inverter set 400A, 400B, 400C. Optionally, each inverter set 400A, 400B, 400C may convert the first direct current into a direct current output. FIG. 5 illustrates each of the plural inverter sets of FIG. 4 operating in a first mode of operation. The first inverter set 400A converts the direct current into a first single, common phase 502A of alternating current from each of the switches 102, 104, 106 of the first inverter set 400A. For example, the phase of the AC that is output from each of the switches of the first inverter set 400A may be the same phase. Each of the outputs from each of the switches 102, 104, 106 are added together to create the first single, common phase 502A of alternating current. Additionally, the second set 400B converts the first direct current into a different, second single, common phase 502B of alternating current from each of the switches 402, 404, 406 of the second inverter set 400B. For example, the AC that is output from each of the switches of the second inverter set 400B may be in the same phase. Each of the outputs from each of the switches 402, 404, 406 are added together to create the second single, common phase 502B.

The third inverter set 400C converts the first direct current into a third single, common phase 502C of alternating current from each of the switches 502, 504, 506 of the third inverter set 400C. The third single, common phase 502C is different than the first phase 502A and the second phase 502B. Each of the outputs from each of the switches 502, 504, 506 are added together to create the third single, common phase 502C. For example, the phase of the AC that is output from each of the switches of the third inverter set 400C may be the same phase. Each of the common phases 502A, 502B, 502C may be used to power the higher-demand load 122 of the powered system 10 with each of the different single phases 502A, 502B, 502C of alternating current.

In the illustrated embodiment, each of the inverter sets 400A, 400B, 400C includes three switches that convert the direct current into each single, common phase 502A, 502B, 502C, respectively that have substantially the same voltage amplitude. For example, each of the single, common phases 502A, 502B, 502C has a voltage that can be three times the voltage of each of the switches of each inverter set. Optionally, one or more of the inverter sets 400A, 400B, 400C may have less than three or greater than three switches. For example, an inverter set that has two switches may convert the direct current into a common phase of alternating current that has a voltage that is two-times the voltage of the alternating current of each of the switches. Optionally, an inverter set that has four switches may convert the direct current into a common phase of alternating current that has a voltage that is four-times the voltage of the alternating current of each of the switches.

Additionally, each of the inverter sets 400A, 400B, 400C converts the direct current into alternating current having different phases. In the illustrated embodiment, the phases of the outputs 502A, 502B, 502C are sixty degrees off from each other. For example, the first inverter set 400A has a first single, common phase 502A that begins a phase at a time of T=0, the second inverter set 400B has a different, second single, common phase 502B that begins a phase at a time of T1, and the third inverter set 400C has a third single, common phase 502C that begins a phase as a time of T2. In the illustrated embodiment, the waveform outputs of each of the inverter sets 400A, 400B, 400C have substantially common voltage amplitudes and common periods over time, but have different phases. Optionally, the first, second, and third inverter set 400A, 400B, 400C may have any number of switches in any configuration such that the inverter sets may output waveforms that have common or unique voltage amplitudes, periods, and/or phases relative to each other.

Each of the inverter sets 400A, 400B, 400C are also operably coupled with a master switch 450. For example, each of the sets 400A, 400B, 400C are operably coupled with the master switch 450 such that the AC provided by each switch is directed through the master switch 450. The master switch 450 directs the different, single phases of AC converted by each of the sets 400A, 400B, 400C to one or more different higher-demand loads (not shown) of the powered system 10.

Each of the inverter sets 400A, 400B, 400C may operate to provide a single, common phase of electrical power output to power higher power loads or provide multiple, different single phases of electrical power outputs to power lower power loads while using the same hardware. For example, each of the inverter sets 400A, 400B, 400C may operate in the first mode of operation or in the second mode of operation using the same hardware for both modes of operation. A master controller may control operation of each of the switch controllers of each of the inverter sets between the open and closed states to operate each inverter set in the first mode of operation (e.g., to power the higher-demand load of the powered system) and/or to operate each inverter set in the second mode of operation (e.g., to power the lower-demand load of the powered system) while using the same hardware.

In one or more embodiments, one or more inverter systems 100 may be operably coupled with two or more different powered systems (not shown). For example, a first inverter system may be operably coupled with a first vehicle of a vehicle consist and a second inverter system may be operably coupled with a second vehicle of the vehicle consist. The first inverter system may be operating in a first mode of operation in order to convert the direct current into a single, common phase of electrical power output (e.g., alternating current or direct current) in order to power a higher-demand load (e.g., a propulsion-generating load that may be used to propel the vehicle) of the first vehicle. The second inverter system may be operating in a second mode of operation in order to convert the direct current into multiple, different phases of electrical power outputs (e.g., alternating current outputs or direct current outputs) in order to power a lower-demand load (e.g., a non-propulsion generating load that may be used to power an auxiliary system of the vehicle) of the second vehicle. Optionally, both the first and second inverter sets may be operating in the same first or second mode of operation. Optionally, operation of the first and second inverter sets may be controlled by a common master controller or each of the first and second inverter sets may be controlled by different master controllers.

Additionally, each of the inverter systems 100 may have a common configuration relative to each other inverter set. For example, each system may have a common shape, size, material, or the like, of a housing (not shown). Additionally, each system may have a common number of heatsinks wherein each heatsink has a common make, model, rating, common positioning, size, shape, or the like. For example, the inverter systems may be used interchangeably with each other to power different loads of the powered system based on the different loads of the powered system that need to be powered.

Figure 6:
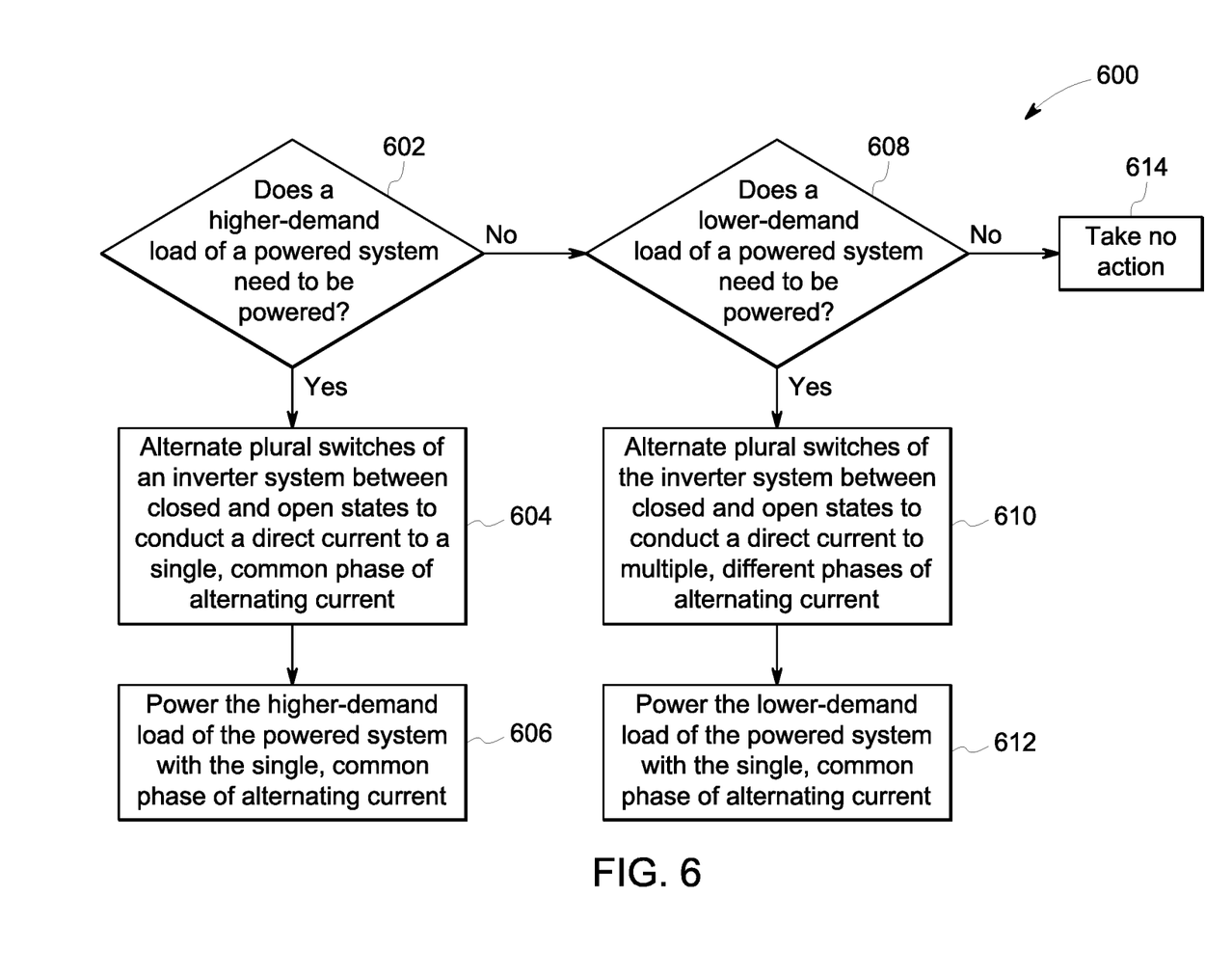
FIG. 6 is a flowchart of a method of operating an inverter system of a powered system in accordance with one embodiment.

FIG. 6 is a flowchart 600 of a method of operating an inverter system of a powered system in accordance with one embodiment. At 602, a determination is made if a higher-demand load of a powered system needs to be powered. The higher-demand load may be a propulsion-generating load that may be used to propel a vehicle of the powered system. Optionally, the higher-demand load may be a different load that may be used to operate one or more systems of a vehicle or vehicle system. Optionally, the higher-demand load may be any alternative load of any powered system. If the higher-demand load needs to be powered, flow of the method proceeds to 604. Alternatively, if the higher-demand load does not need to be powered, flow of the method proceeds to 608.

At 604, plural switches of the inverter system are controlled by plural switch controllers to operate the inverter system in a first mode of operation. Optionally, the first mode of operation may be referred to as a traction inverter mode that provides power to the propulsion-generating load of the powered system. The switch controllers and/or the master controller control each of the switches to operate between closed and open states to conduct a first direct current to a single, common phase of a first electrical power output from all of the switches to power the higher-demand load with the first electrical power output. The first electrical power output may be a single-phase alternating current or may be a direct current output having a first voltage and a first power level. For example, when operating in the first mode of operation, each of the switches outputs electrical power having a common phase as each other output from each other switch. At 606, each of the switch outputs are added together for the single, common phase of the inverter system to power the higher-demand load of the powered system with the single, common phase of the electrical power output.

At 608, a determination is made if a lower-demand load of the powered system needs to be powered. The lower-demand load may be a non-propulsion generating load of the powered system. Additionally, the lower-demand load may be a load of the powered system that requires an amount of power that is less than an amount of power required to power the higher-demand load of the powered system. If the lower-demand load needs to be powered, flow of the method proceeds to 610. Alternatively, if the lower-demand load does not need to be powered, flow of the method proceeds to 612 where no action is taken and the inverter system is not used to power a load of the powered system.

At 610, the plural switches of the inverter system are controlled by the plural switch controllers to operate the inverter system in a second mode of operation. Optionally, the second mode of operation may be referred to as an auxiliary inverter mode that provides power to the non-propulsion-generating load of the powered system. The switch controllers and/or the master controller control each of the switches to operate between closed and open states to conduct the direct current to multiple second electrical power outputs. The second electrical power outputs may be different phases of three-phase alternating current or respective direct current outputs having voltage and/or power levels that are lower or less than the first voltage and first power levels of the direct current output of the first electrical power output. For example, when operating in the second mode of operation, each of the switch outputs electrical power outputs having different phases relative to each other switch output. At 612, the multiple, different electrical power outputs (e.g., AC outputs or DC outputs) from each of the switches are used to power the lower-demand load of the powered system with the multiple, different phases of alternating current.

Optionally, the plural switches and the plural switch controllers may be included in a single inverter set, and the powered system may include plural different inverter sets. Each of the different inverter sets may include plural switches and plural switch controllers. Additionally, each of the different inverter sets may convert the direct current into different, single phases of alternating current or into a direct current output. For example, a first set may convert the direct current to a first single, common phase of alternating current, and a second set may convert the direct current to a different, second single, common phase of alternating current that has a different phase than the first set.

In an embodiment of the subject matter described herein, an inverter system comprises plural switches that alternate between closed and open states to conduct or block conduction, respectively, of electric current through the switches. The system includes plural switch controllers that control operation of the switches between the closed and open states. In a first operating mode, the switch controllers control the operation of the switches to convert direct current into a single, common phase of an alternating current from a same phase output from each of the switches to power a higher-demand load of a powered system with the single phase of the alternating current. In a second operating mode, the switch controllers control the operation of the switches to convert the direct current into multiple, different phases of the alternating current to power a lower-demand load of the powered system with the multiple, different phases of the alternating current. Each of the switches outputs a different phase of the multiple phases.

Optionally, the plural switches and the plural switch controllers are included in a single inverter set of plural inverter sets of the powered system. Each of the inverter sets converts the direct current into a different single phase of the alternating current relative to each other of the inverter sets to power the higher-demand load of the powered system with the different single phases of the alternating current.

Optionally, a first inverter set of the plural inverter sets converts the direct current into a first single, common phase of the alternating current from each of the switches of the first inverter set, and a second inverter set of the plural inverter sets converts the direct current into a different, second single, common phase of the alternating current from each of the switches of the second inverter set.

Optionally, the plural switches are electrically coupled with each other in a parallel electrical connection or in a series electrical connection.

Optionally, the higher-demand load is a propulsion-generating load that propels a vehicle of the powered system and the lower-demand load is a non-propulsion-generating load.

Optionally, the inverter system operates in a traction inverter mode when the switches convert the direct current into the single, common phase of the alternating current from the same phase output from each of the switches.

Optionally, the inverter system operates in an auxiliary inverter mode when the switches convert the direct current into the multiple, different phases of the alternating current.

Optionally, the inverter system also includes a master controller to control operation of the plural switch controllers. The master controller directs the plural switch controllers to control operation of the switches between the closed and open states.

Optionally, the same phase output from each of the switches are added together for the single, common phase of the higher-demand load.

In an embodiment of the subject matter described herein, a method comprises in a first operating mode, with plural switch controllers, alternating plural switches between closed and open states to conduct a direct current supplied to the switches to a single, common phase of an alternating current from a same phase output from each of the switches. The method also comprises in a different, second operating mode, with the plural switch controllers, alternating the switches between the closed and open states to convert the direct current to multiple, different phases of the alternating current. Each of the switches outputs a different phase of the multiple phases. The single, common phase of the alternating current that is generated in the first operating mode is supplied to a powered system as a higher-demand load, and the multiple, different phases of the alternating current that is generated in the second operating mode is supplied to the powered system as a lower-demand load.

Optionally, the plural switches and the plural switch controllers are included in a single inverter set of plural inverter sets of the powered system. Each of the inverter sets converts the direct current into a different single phase of the alternating current relative to each other of the inverter sets to power the higher-demand load of the powered system with the different single phases of the alternating current.

Optionally, a first inverter set of the plural inverter sets converts the direct current into a first single, common phase of the alternating current from each of the switches of the first inverter set, and a second inverter set of the plural inverter sets converts the direct current into a different, second single, common phase of the alternating current from each of the switches of the second inverter set.

Optionally, the plural switches are electrically coupled with each other in a parallel electrical connection or in a series electrical connection.

Optionally, the higher-demand load is a propulsion-generating load that propels a vehicle of the powered system and the lower-demand load is a non-propulsion-generating load.

Optionally, the method also includes operating in a traction inverter mode when the switches convert the direct current into the single, common phase of the alternating current from the same phase output from each of the switches.

Optionally, the method also includes operating in an auxiliary inverter mode when the switches convert the direct current into the multiple, different phases of the alternating current.

Optionally, the method also includes controlling operation of the switch controllers with a master controller. The master controller directs the plural switch controllers to control operation of the switches between the closed and open states.

Optionally, the same phase output from each of the switches are added together for the single, common phase of the higher-demand load.

In an embodiment of the subject matter described herein, a vehicle inverter system comprises plural switches that alternate between closed and open states to conduct or block conduction, respectively, of electric current through the switches. The system includes plural switch controllers that control operation of the switches between the closed and open states. In a first operating mode, the switch controllers control the operation of the switches to convert direct current into a single, common phase of an alternating current from a same phase output from each of the switches to power a propulsion-generating load of a vehicle system with the single phase of the alternating current. In a second operating mode, the switch controllers control the operation of the switches to convert the direct current into multiple, different phases of the alternating current to power a non-propulsion-generating load of the vehicle system with the multiple, different phases of the alternating current. Each of the switches outputs a different phase of the multiple phases.

Optionally, the same phase output from each of the switches are added together for the single, common phase of the higher-demand load.

Optionally, the vehicle inverter system also includes a master controller to control operation of the plural switch controllers. The master controller directs the plural switch controllers to control operation of the switches between the closed and open states.

In an embodiment of the subject matter described herein, an inverter system comprises plural switches controllable between closed and open states to conduct or block conduction, respectively, of electric current through the switches, and plural switch controllers to control operation of the switches between the closed and open states. In a first operating mode, the switch controllers control the operation of the switches to convert first direct current into a single, common, first electrical power output from all of the switches to power a higher-demand load of a powered system with the first electrical power. In a second operating mode, the switch controllers also control the operation of the switches to convert the first direct current into multiple second electrical power outputs to power one or more lower-demand loads of the powered system with the second electrical power outputs. Each of the switch outputs a different one of the second electrical power outputs and the second electrical outputs have different voltage levels or different waveforms from each other second electrical power output.

Optionally, the first electrical power output is a single-phase alternating current, and the second electrical outputs are different phases of three-phase alternating current for powering a single one of the one or more lower-demand loads or the first electrical power output is a direct current output having a first voltage and first power level, and the second electrical power outputs are respective direct current outputs having voltage levels and power levels that are lower than the first voltage level and the first power level of the direct current output of the first electrical power output.

Optionally, the single, common, first electrical power output from all of the switches are added together to power the higher-demand load.

Optionally, the electrical current from all of the switches are added together for the single, common, first electrical power output to power the high-demand load of the powered system with the first electrical power.

Optionally, a master controlled is configured to control operation of the plural switch controllers. The master controlled directs the plural switch controllers to control operation of the switches between the closed and open states.

Optionally, the higher-demand load is a propulsion-generating load that propels the powered system, and the lower-demand load is a non-propulsion-generating load.

In an embodiment, the powered system as shown in FIG. 1 is or includes a marine vessel that includes an inverter system 100 and a DC link busbar 120. The inverter system 100 is configured to convert electrical power to or from the DC link busbar 120. The marine vessel includes one or more electrical loads that are configured to receive electrical power (e.g., converted electrical power) from the busbar and/or the inverter system. Such loads may include auxiliary motors. Such loads may also include one or more traction motors, by which it is meant (in the context of a marine vessel) a motor or motors that have a large enough power output and are arranged/coupled, singularly or in concert, to move the marine vessel for propulsion along a heading. For example, the one or more traction motors may be operably coupled to a propeller drive system, such that when the traction motor(s) receives designated electrical power (in terms of magnitude and waveform) it causes a propeller to rotate (e.g., directly, or via a shaft/drive/gear system) for vessel propulsion. Other loads may include pumps, hydraulic actuators, etc.

In an embodiment, the powered system as shown in FIG. 1 is or includes a rail vehicle (e.g., locomotive) that includes an inverter system 100 and a DC link busbar 120. The inverter system is configured to convert electrical power to or from the DC link busbar. The rail vehicle includes one or more electrical loads that are configured to receive electrical power (e.g., converted electrical power) from the busbar and/or the inverter system. Such loads may include auxiliary motors. Such loads may also include one or more traction motors, by which it is meant a motor or motors that have a large enough power output and are arranged/coupled, singularly or in concert, to move the rail vehicle for propulsion along a route. For example, the one or more traction motors may be operably coupled to respective wheel-axle pairs (e.g., via bull gears), such that when the traction motor(s) receives designated electrical power (in terms of magnitude and waveform) it causes the axle and wheels of a wheel-rail pair to rotate for vehicle movement along a rail. Other loads may include pumps, hydraulic actuators, compressors, etc.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the clauses, and may include other examples that occur to one of ordinary skill in the art. Such other examples are intended to be within the scope of the clauses if they have structural elements that do not differ from the literal language of the clauses, or if they include equivalent structural elements with insubstantial differences from the literal languages of the clauses.

As used herein, an element or step recited in the singular and proceeded with the word "a" or "an" should be understood as not excluding plural of said elements or operations, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. An inverter system comprising:
   plural switches configured to alternate between closed and open states to conduct or block conduction, respectively, of electric current through the switches; and
   plural switch controllers configured to control operation of the switches between the closed and open states,
   wherein, in a first operating mode, the switch controllers are configured to control the operation of the switches to convert direct current into a single, common phase of an alternating current from a same phase output from each of the switches to power a higher-demand load of a powered system with the single phase of the alternating current, and
   wherein, in a second operating mode, the switch controllers also are configured to control the operation of the switches to convert the direct current into multiple, different phases of the alternating current to power a lower-demand load of the powered system with the multiple, different phases of the alternating current, wherein each of the switches outputs a different phase of the multiple phases.

2. The inverter system of claim 1, wherein the plural switches and the plural switch controllers are included in a single inverter set of plural inverter sets of the powered system, wherein each of the inverter sets is configured to convert the direct current into a different single phase of the alternating current relative to each other of the inverter sets to power the higher-demand load of the powered system with the different single phases of the alternating current.

3. The inverter system of claim 2, wherein a first inverter set of the plural inverter sets is configured to convert the direct current into a first single, common phase of the alternating current from each of the switches of the first inverter set, and wherein a second inverter set of the plural inverter sets is configured to convert the direct current into a different, second single, common phase of the alternating current from each of the switches of the second inverter set.

4. The inverter system of claim 1, wherein the plural switches are configured to be electrically coupled with each other in a parallel electrical connection or in a series electrical connection.

5. The inverter system of claim 1, wherein the higher-demand load is a propulsion-generating load that propels a vehicle of the powered system, and wherein the lower-demand load is a non-propulsion-generating load.

6. The inverter system of claim 1, further comprising a master controller configured to control operation of the plural switch controllers, wherein the master controller is configured to direct the plural switch controllers to control operation of the switches between the closed and open states.

7. The inverter system of claim 1, wherein the same phase output from each of the switches are added together for the single, common phase of the higher-demand load.

8. A method comprising:
in a first operating mode, with plural switch controllers, alternating plural switches between closed and open states to conduct a direct current supplied to the switches to a single, common phase of an alternating current from a same phase output from each of the switches; and
in a different, second operating mode, with the plural switch controllers, alternating the switches between the closed and open states to convert the direct current to multiple, different phases of the alternating current, wherein each of the switches outputs a different phase of the multiple phases;
wherein the single, common phase of the alternating current that is generated in the first operating mode is supplied to a powered system as a higher-demand load; and
wherein the multiple, different phases of the alternating current that is generated in the second operating mode is supplied to the powered system as a lower-demand load.

9. The method of claim 8, wherein the plural switches and the plural switch controllers are included in a single inverter set of plural inverter sets of the powered system, wherein each of the inverter sets is configured to convert the direct current into a different single phase of the alternating current relative to each other of the inverter sets to power the higher-demand load of the powered system with the different single phases of the alternating current.

10. The method of claim 9, wherein a first inverter set of the plural inverter sets is configured to convert the direct current into a first single, common phase of the alternating current from each of the switches of the first inverter set, and wherein a second inverter set of the plural inverter sets is configured to convert the direct current into a different, second single, common phase of the alternating current from each of the switches of the second inverter set.

11. The method of claim 8, wherein the plural switches are configured to be electrically coupled with each other in a parallel electrical connection or in a series electrical connection.

12. The method of claim 8, wherein the higher-demand load is a propulsion-generating load that propels a vehicle of the powered system, and wherein the lower-demand load is a non-propulsion-generating load.

13. The method of claim 8, further comprising controlling operation of the switch controllers with a master controller, wherein the master controller is configured to direct the plural switch controllers to control operation of the switches between the closed and open states.

14. The method of claim 8, wherein the same phase output from each of the switches are added together for the single, common phase of the higher-demand load.

15. An inverter system comprising:
plural switches controllable between closed and open states to conduct or block conduction, respectively, of electrical current through the switches; and
plural switch controllers configured to control operation of the switches between the closed and open states,
wherein, in a first operating mode, the switch controllers are configured to control the operation of the switches to convert first direct current into a single, common, first electrical power output from all of the switches to power a higher-demand load of a powered system with the first electrical power, and
wherein, in a second operating mode, the switch controllers also are configured to control the operation of the switches to convert the first direct current into multiple second electrical power outputs to power one or more lower-demand loads of the powered system with the second electrical power outputs, wherein each of the switches outputs a different one of the second electrical power outputs and the second electrical power outputs have one or more of different voltage levels or different waveforms from each other second electrical power output.

16. The inverter system of claim 15, wherein:
the first electrical power output is a single-phase alternating current, and the second electrical power outputs are different phases of three-phase alternating current for powering a single one of the one or more lower-demand loads; or
the first electrical power output is a direct current output having a first voltage level and a first power level, and the second electrical power outputs are respective direct current outputs having voltage levels and power levels that are lower than the first voltage level and the first power level of the direct current output of the first electrical power output.

17. The inverter system of claim 15, wherein the single, common, first electrical power output from all of the switches are added together to power the higher-demand load.

18. The inverter system of claim 15, wherein the electrical current from all of the switches are added together for the single, common, first electrical power output to power the higher-demand load of the powered system with the first electrical power.

19. The inverter system of claim 15, further comprising a master controller configured to control operation of the plural switch controllers, wherein the master controller is configured to direct the plural switch controllers to control operation of the switches between the closed and open states.

20. The inverter system of claim 15, wherein the higher-demand load is a propulsion-generating load that propels the powered system, and wherein the lower-demand load is a non-propulsion-generating load.

* * * * *